United States Patent
Gutman et al.

[15] 3,669,161
[45] June 13, 1972

[54] DRIVE MECHANISM FOR TREE HARVESTERS

[72] Inventors: Nathan Gutman, Washington; Raymond L. Moser, Tremont; Dorrance Oldenburg, Peoria; Donald E. Sunderlin, Washington, all of Ill.

[73] Assignee: Caterpillar Tractor Co., Peoria, Ill.

[22] Filed: July 27, 1970

[21] Appl. No.: 58,465

[52] U.S. Cl. .............................. 144/3 D, 144/2 Z
[51] Int. Cl. ........................................ A01g 23/02
[58] Field of Search .......... 144/2 Z, 3 D, 34 R, 34 E, 309 AC, 144/246 R, 242 R

[56] References Cited

UNITED STATES PATENTS

| | | | |
|---|---|---|---|
| 3,542,099 | 11/1970 | Gibson | 144/3 D |
| 3,498,350 | 3/1970 | Maradyn | 144/3 D |
| 2,936,008 | 5/1960 | Brown | 144/34 R |
| 3,275,049 | 9/1966 | Gunn | 144/246 R |
| 3,285,305 | 11/1966 | Nicholson | 144/208 R |
| 3,556,183 | 1/1971 | Busch | 144/34 R |
| 3,595,284 | 7/1971 | Landers | 144/2 Z |

FOREIGN PATENTS OR APPLICATIONS

| | | | |
|---|---|---|---|
| 135,723 | 7/1960 | U.S.S.R. | 144/2 Z |

*Primary Examiner*—Gerald A. Dost
*Attorney*—Fryer, Tjensvold, Felix, Phillips & Lempio

[57] ABSTRACT

A drive mechanism for a tree harvester including a frame movably mounted on a vehicle, the drive mechanism being secured to the frame along with delimbing and shear assemblies arranged on opposite sides of the drive mechanism, the drive mechanism comprising an endless track trained about a drive sprocket and rollers, the rollers supporting a portion of the track in alignment with the delimbing assembly, grapples being operable to secure a tree in driven engagement with the supported track portion while permitting the tree to be axially moved relative to the delimbing assembly and shear assembly for processing.

15 Claims, 6 Drawing Figures

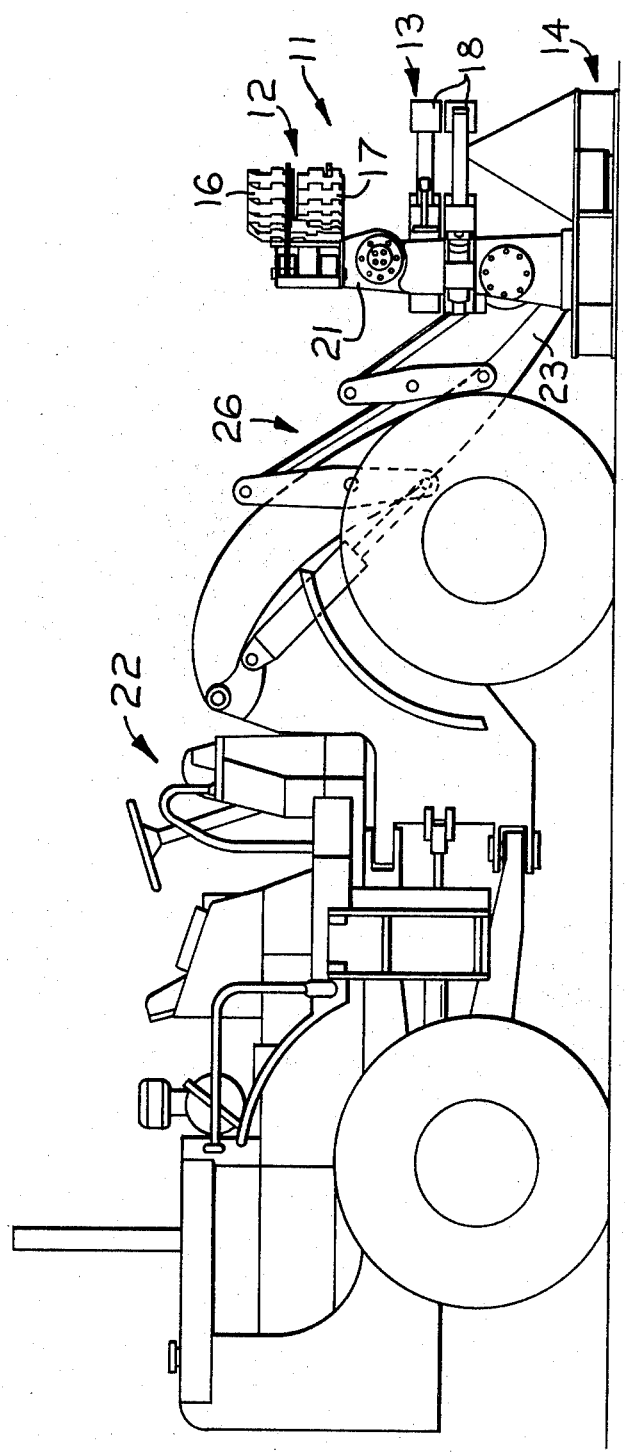

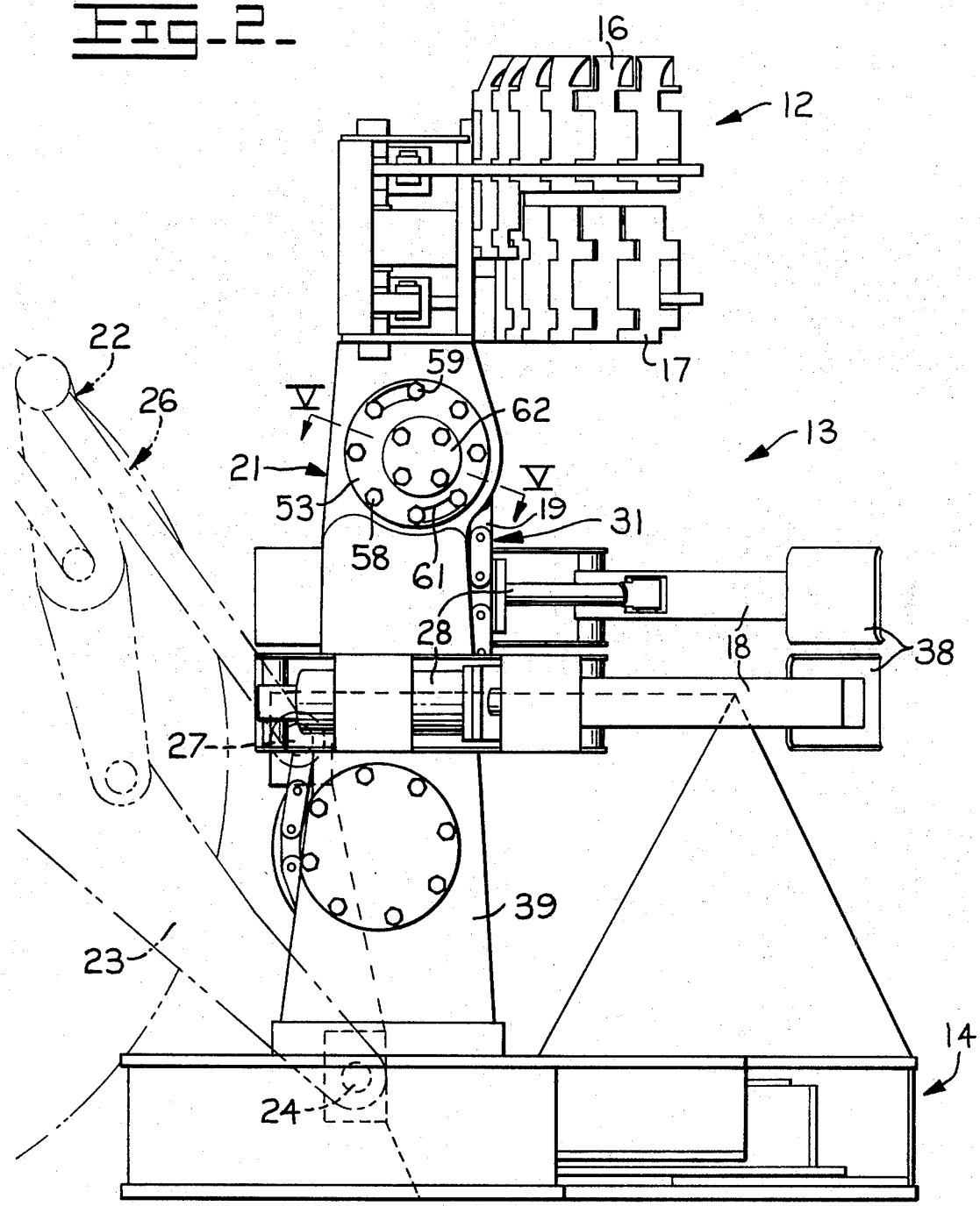

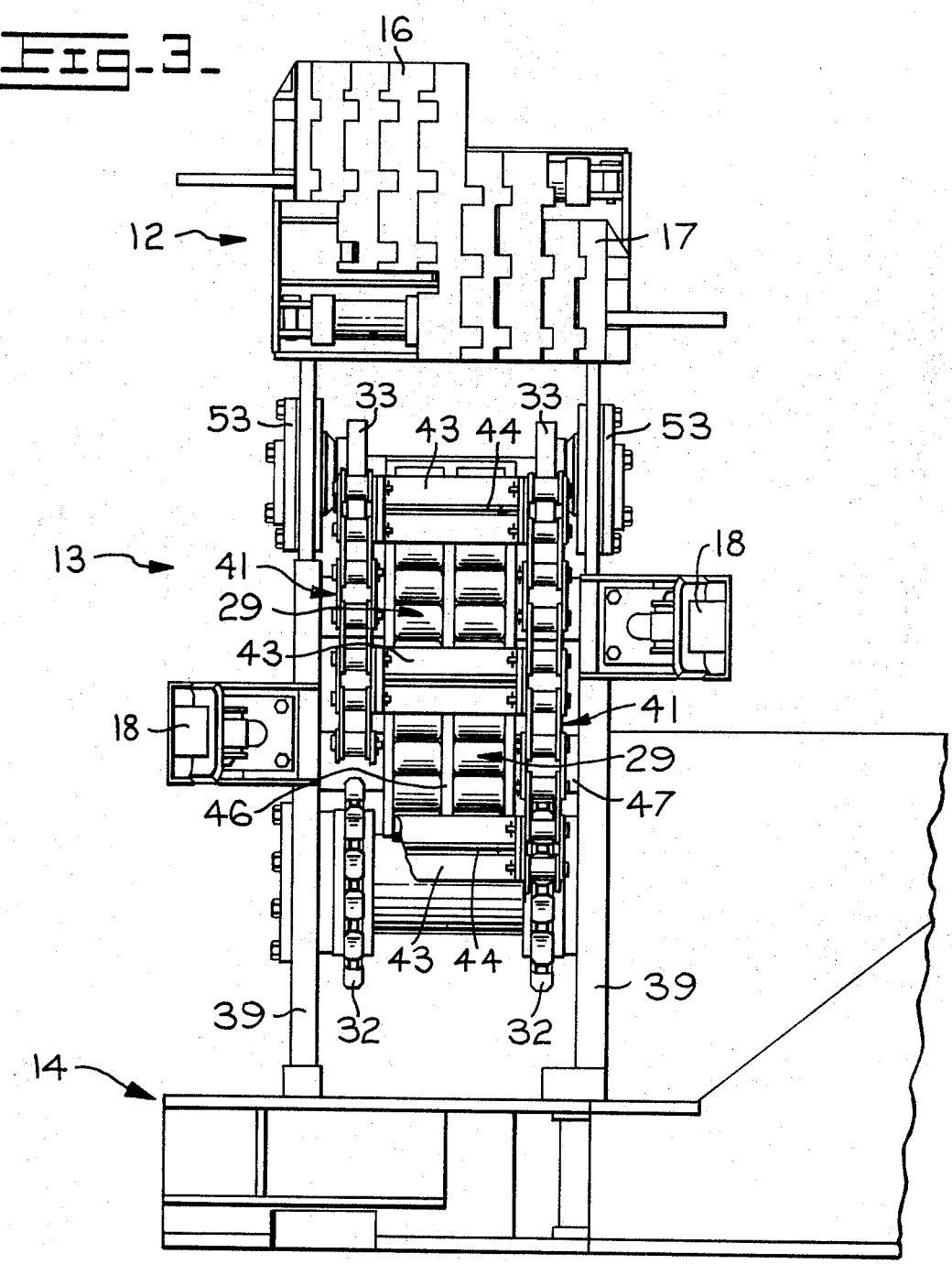

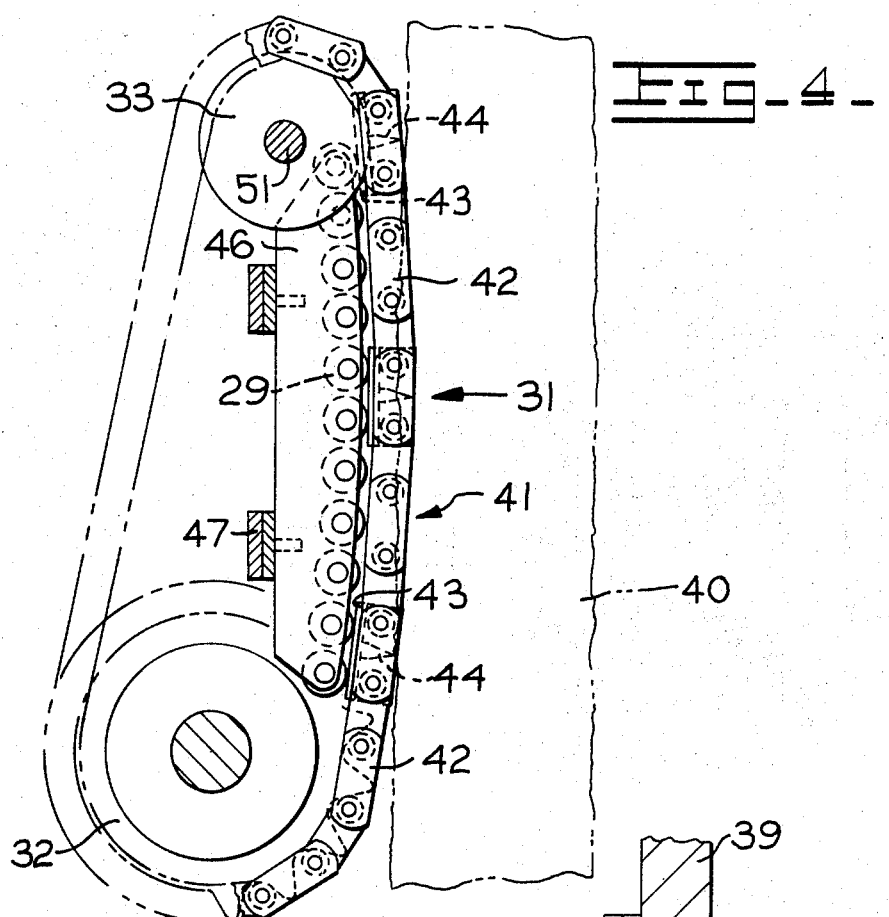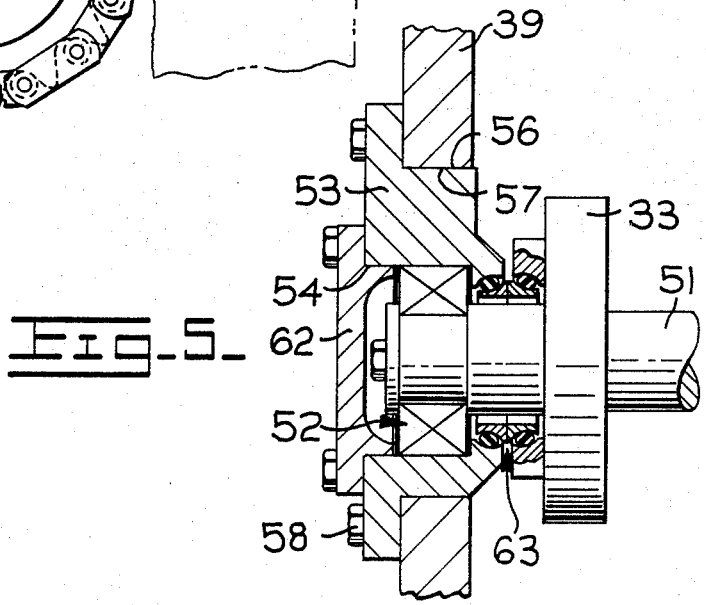

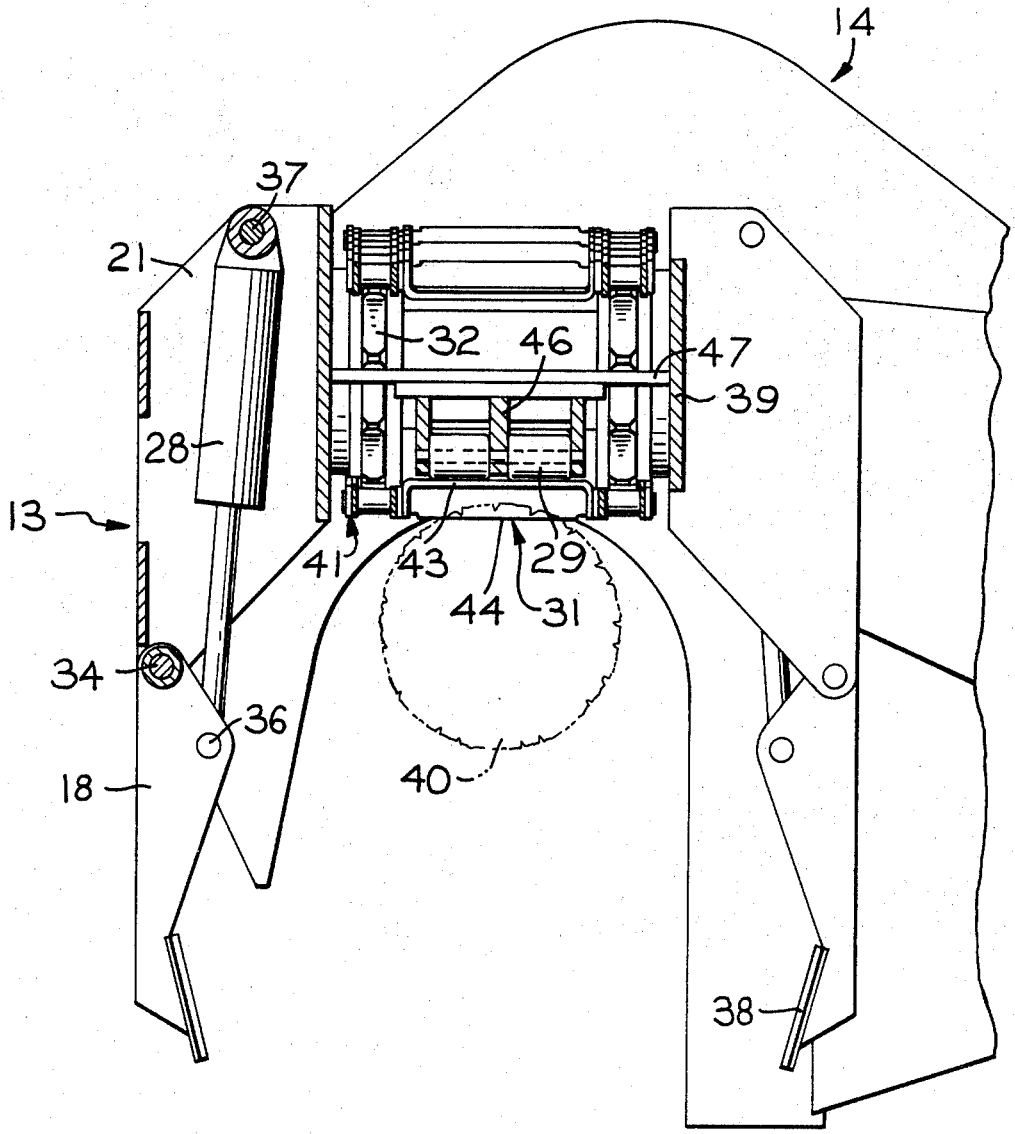

DRIVE MECHANISM FOR TREE HARVESTERS

Portions of the present tree harvester, the specific construction of which is not a particular part of the present invention, are described in greater detail in application Ser. No. 58,466, filed by R. L. Moser et al. on July 27, 1970, and application Ser. No. 58,467, filed by R. L. Moser, et al. on July 27, 1970, both of which are assigned to the assignee of the present invention.

The present invention relates to a drive mechanism as part of a tree harvester in which the drive mechanism and one or more processing implements are secured in operating alignment on a frame adapted to be movably mounted on a vehicle. The drive mechanism is particularly contemplated for use in combination with a delimbing assembly and preferably a shear assembly as an additional processing implement.

With tree harvesters of this type, a vehicle may position the harvester apparatus in proper engagement with a standing tree which is severed and maintained in engagement with the processing implements. The frame may then be rotated or shifted into a position permitting the tree to be fed or axially moved through the implements for further processing. Preferably, such further processing includes delimbing of the tree and cutting it into appropriate lengths or sections.

In order to permit complete processing of trees or the like, they must be firmly secured in proper engagement with the implements. This is particularly important because of the cantilevering effect when a cut tree is moved from a standing position into a horizontal position for processing. In addition, the tree must be held in engagement with the drive mechanism which must then be effective to shift the relatively heavy trees through the implements.

It is further desirable that the various components be reliable while also being relatively simple and compact to permit their common mounting on the movable frame.

Accordingly, it is an object of the present invention, to provide a suitable drive mechanism for mounting on a movable frame together with one or more processing implements, the drive mechanism being effective to maintain the tree in proper alignment while shifting it through the implements for processing.

It is a further object to employ an endless track in the drive mechanism with a portion of the track being supported to insure positive engagement with the tree while maintaining proper alignment of the tree with the processing implements.

Other objects and advantages of the invention will be apparent from the following description of a preferred embodiment of the present tree harvester having reference to the accompanying drawings.

In the drawings:

FIG. 1 is a side elevation view of a tree harvester apparatus mounted on a vehicle by means of a movable frame;

FIG. 2 is an enlarged view similar to FIG. 1 showing a portion of the vehicle and illustrating the harvester apparatus in greater detail, FIG. 3 is a front view of the tree harvester as seen from the right side of FIG. 2;

FIG. 4 is an enlarged fragmentary side view of a drive mechanism for the harvester apparatus with a tree being shown in phantom;

FIG. 5 is an enlarged fragmentary view taken along section line V—V of FIG. 2 to illustrate one of a pair of rollers and a tensioning device for the drive mechanism, and FIG. 6 is an enlarged plan view of the drive mechanism showing additional features of its construction and portions of the shear assembly, a tree also being illustrated in engagement with the drive mechanism but with the grapples extended to more clearly show the relation between the tree and drive mechanism.

Referring particularly to FIGS. 1 and 2, a preferred embodiment of a tree harvester apparatus constructed according to the present invention is indicated at 11 including a delimbing assembly 12, a shear assembly 14 and a drive mechanism indicated at 13 for securing trees to be processed and axially shifting them through the harvester apparatus.

The delimbing assembly 12 and the shear assembly 14 are described in greater detail by the two references noted above. For purposes of the present invention, it is sufficient to note that the delimbing assembly 12 includes a pair of flexible blades 16 and 17 which may be positioned for providing a cutting edge about the circumference of a tree properly arranged within the harvester apparatus.

The shear assembly 14 includes a swinging blade (not shown) which is operable to shear or cut through a tree arranged within the harvester apparatus. In the present preferred embodiment of the tree harvester apparatus, the shear assembly 14 is effective both to sever a standing tree and further to cut the tree into selected lengths or sections when the harvester apparatus is operated in a manner described in greater detail below.

The drive mechanism 13, which is described in greater detail below, basically includes grapples 18 which are effective to secure a tree within the harvester apparatus against an endless drive track 19 (See FIG. 2, for example) which may then be operated in rotation to shift the tree through the harvester apparatus.

In the preferred embodiment of the present invention, the delimbing assembly 12, the drive mechanism 13 and the shear assembly 14 are all supported in fixed relation upon a common frame structure 21 which is movably mounted upon a vehicle 22. The vehicle is of a type having conventional lift arms, one of which is indicated at 23, with the frame 21 being secured to the lift arms 23 by means of horizontal pivots such as that indicated at 24 (See FIG. 2). A conventional tilt linkage 26 on the vehicle is also pivoted to the frame 21 at a location 27 (Also see FIG. 2) above the pivot axis 24. The tilt linkage is thus effective to pivot the frame 21 and the various portions of the tree harvester apparatus about the horizontal pivot 24.

In operation, the tree harvester apparatus is positioned by the vehicle to receive a standing tree in alignment with the shear assembly, the drive mechanism and the delimbing assembly while the common frame 21 is in a generally vertical position as illustrated in FIG. 1. The grapples 18 are then shifted to secure the tree against the drive track 19. The flexible blades 16 and 17 of the delimbing assembly may also be brought into engagement about the circumference of the tree at that time.

The tree is then severed by the shear assembly after which the top of the tree harvester apparatus 11 is rotated forwardly and downwardly by the tilt linkage to place the tree in a generally horizontal position. It is important to note at this point that the tree is secured near its base within the harvester apparatus. A substantial length of the tree extends forwardly and outwardly from the harvester apparatus so that cantilevering action of the tree applies substantial forces tending to pivot the tree out of its proper alignment within the harvester apparatus. In such a tree harvester apparatus, the drive mechanism 13 has been found to be particularly effective in combination with one or more implements such as the delimbing assembly 12 and the shearing assembly 14 for securing the tree in proper alignment within the harvester apparatus.

With the harvester apparatus and tree shifted to the position described immediately above, the tree is then fed or shifted by the drive track 19 through the delimbing assembly for the removing of limbs from the tree and toward the shear assembly. During this mode of operation, the shear assembly 14 may also be intermittently operated for cutting the delimbed tree into appropriate lengths or sections.

Construction features of the drive mechanism 13 are also illustrated in FIGS. 3–6. Referring particularly to FIGS. 2 and 4 of the drawings, major components of the drive mechanism include the grapples 18, hydraulic motors 28 for positioning the grapples, the endless drive track 19, a plurality of rollers 29 for maintaining a portion 31 of the track in alignment and driving engagement with a tree secured thereagainst by the grapples 18. The track is trained about drive sprockets such as that indicated as 32 and idler rollers, one of which is indicated at 33, adapted for varying tension within the drive track 19.

As may be best seen in FIG. 6, the grapples 18 are pivoted respectively at 34 to the frame 21 on opposite sides of the drive mechanism and extend outwardly or forwardly from the frame and drive track. The hydraulic motors or jacks 28 are respectively pivoted between the grapple arms 18 at 36 and the frame 21 at 37 for moving the grapples between outwardly extending positions as illustrated in FIG. 6 to receive a tree within the harvester apparatus and a retracted position for securing the tree against the track portion 31.

As may be best seen in FIG. 2, the grapples 18 are arranged in offset relation to each other and are provided with skid plates 38. The offset relation of the grapples serve to firmly secure the tree against the drive track and in proper alignment with the delimbing assembly 12 and the shear assembly 14. The skid plates 38 permit the tree to be axially shifted through the delimbing assembly and toward the shear assembly 14 during processing of the tree.

Construction details of the drive track 19 and the various components for mounting it upon the frame 21 may be seen having reference to FIGS. 2–6. As may be best seen in FIG. 3, the frame 21 includes two spaced apart members 39 which form the primary support for the various components of the drive mechanism.

Referring now particularly to FIGS. 3 and 4, the endless drive track 19 includes a pair of chains 41, each comprised of a plurality of flexibly linked elements 42 (See FIG. 4), respectively trained about drive sprockets 32 and idler rollers 33.

Flights 43 extend between and are connected to the chains 41 in parallel spaced apart relation along the length of the drive track 19, the arrangement of the flights 43 being shown in FIG. 4. Each of the flights 43 has an outwardly projecting sharpened edge 44 for penetrating the tree 40 (See FIG. 4) as the tree is positioned by the grapples 18. The edges 44 on the flights thus prevent slippage between the drive track 19 and the tree while it is being shifted through the delimbing assembly and shear assembly. The arrangement of the blades 44 and the force applicable to the grapples 18 by the jacks 28 provide for substantial penetration of the tree by the blades 44, for example, to a depth of approximately three-quarters of an inch.

Parallel series of the rollers 29 are rotatably secured to a supporting bracket 46 which is attached to the members 39 of the frame by means of crossbars 47. In order to minimize damage to the tree, the rollers 29 are arranged upon the bracket 46 in curved relation, as best seen in FIG. 4, so that the flights 43 follow a generally arcuate path. The blades 44 are accordingly forced into gradually increasing engagement with the tree. The rollers 29 maintain the blades in firm engagement with the tree and then permit the blades to gradually become disengaged from the tree as they approach the other end of the bracket 46. Preferably, the rollers 29 are arranged to form a continuous arc between the idler rollers 33 and drive sprockets 32 as shown in FIG. 4.

The rollers 29 are arranged to support the flights 43 and not the chains 41 to minimize wear and breakage in the chains.

Referring particularly to FIGS. 4 and 6, the flights 43 are formed as U-shaped brackets which support the blades 44 and attach to the chains 41. The blades are maintained generally in line with the chains (See FIG. 4) to prevent cocking and minimize breaking of the chains during engagement between the blades and the tree.

The blades are arranged along the chains to insure continuous driving engagement with the tree. However, the spacing between blades is sufficient to prevent shearing portions of the tree.

As may also be seen in FIG. 4, the arcuate arrangement of the rollers 29 maintains the idling rollers 33 and drive sprockets 32 in offset relation with the track portion 31. Thus, the drive sprockets and idling rollers are also free from engagement forces between the blades 44 and the tree. By this arrangement, the chains 41 act only to transfer driving force from the drive sprocket to the flight and blade combinations.

The idling rollers 33 are supported upon the frame members 39 in a manner best illustrated in FIG. 5 for adjusting tension on the chains 41. Referring particularly to FIG. 5, both of the idling rollers 33 are secured to a common shaft 51. Each end of the shaft 51 extends outwardly beyond one of the idling rollers 33 toward a bearing mount 52 supported by an indexing plate 53. Each indexing plate 53 is adjustably secured to the adjacent frame member 39 for shifting the position of the shaft 51 and idling rollers 33 to vary tension on the chains 41.

As seen in FIG. 5, the bearing mount 52 is arranged within an off-center bore 54 of the member 53. The indexing plate 53 in turn has a cylindrical outer surface 56 which is arranged within a cylindrical bore 57 in the frame member 39. Referring also to FIG. 2, the indexing plate 53 is secured against rotation relative to the frame member 39 by a plurality of screws 58 as well as screws 59 which penetrate through elongated slots 61 in the plate 53 for threaded engagement with the frame member 39. With such an arrangement, the screws 59 may be loosened so that when the screws 58 are removed, the indexing plate 53 is held in place but may be rotated in order to reposition the off center bore 54, thus shifting the idling rollers 33 and varying tension within the chains 41.

A smaller plate 62 is secured to the plate 53 for enclosing the bearing 52. A rotary seal arrangement 63 is arranged for interaction between each plate 53 and the adjacent idling roller 33 to permit permanent lubrication of the bearing means 52.

Conventional hydraulic motor means (not shown) may be associated with the drive sprocket 32 for driving the endless track 31 in rotation when desired during the processing operation described above.

What is claimed is:

1. A tree harvester comprising
   a frame,
   a shear assembly and a delimbing assembly fixed upon the frame in spaced apart relation,
   a drive mechanism supported by the frame in operative alignment between the shear assembly and delimbing assembly, the drive mechanism including
   endless track means arranged for rotation upon a drive sprocket and rollers mounted on the frame, a plurality of the rollers being located to support a portion of the track means in alignment with the delimbing assembly, the drive sprocket engaging with the track means in generally offset relation to the supported track portion, the track means being provided with projections along its outer surface, the endless track means comprising two chains each trained respectively over a drive sprocket and an idler roller, a number of flights being interconnected between the chains in spaced apart relation, each flight having an outwardly extending, sharpened blade for engaging the tree, the flights being offset relative to the chains for contact with the plurality of rollers so that engagement force of the tree along the supported track portion is received substantially by the plurality of rollers, the blades being arranged generally in alignment with the chains to limit cocking of the blades,
   grapple means extending outwardly from the frame adjacent the supported portion of the track means and being movable between a first position for receiving a tree and a second position for securing the tree in driven engagement with the projections on a portion of the track means supported by the plurality of rollers while permitting the tree to be axially shifted through the delimbing assembly, and
   motor means operatively coupled with the grapple means for movement between the first and second position.

2. The tree harvester of claim 1 wherein the delimbing assembly includes bladed elements adapted for arrangement about a tree and in alignment with the supported portion of the track means.

3. A tree harvester comprising
   a frame,
   a shear assembly and a delimbing assembly fixed upon the frame in spaced apart relation, a drive mechanism supported by the frame in operative alignment between the shear assembly and delimbing assembly, the drive mechanism including endless track means arranged for rotation upon a drive sprocket and rollers mounted on the frame, a plurality of the rollers being located to support a portion of the track means in alignment with the delimbing assembly, the rollers being arranged on the frame to form a curved path for the supported track portion, the drive sprocket engaging with the track means in generally offset relation to the supported track portion, the track means being provided with projections along its outer surface, grapple means extending outwardly from the frame adjacent the supported portion of the track means and being movable between a first position for receiving a tree and a second position for securing the tree in driven engagement with the projections on a portion of the track means supported by the plurality of rollers while permitting the tree to be axially shifted through the delimbing assembly, and motor means operatively coupled with the grapple means for movement between the first and second position.

4. A tree harvester comprising
a frame pivotally mounted on a vehicle,
a shear assembly and a delimbing assembly fixed upon the frame in spaced apart relation,
a drive mechanism supported by the frame in operative alignment between the shear assembly and delimbing assembly, the drive mechanism including an endless track comprising two chains each trained respectively over a drive sprocket and an idler sprocket, the drive sprockets and idler sprockets being rotatably mounted on the frame, a plurality of flights being interconnected between the chains in spaced apart relation, each flight having an outwardly extending blade for engaging a tree, means being arranged on the frame to support the flights while their respective blades are in engagement with the tree,
motor means coupled with the drive sprockets for operating the drive mechanism,
grapple means extending outwardly from the frame adjacent the endless track and being movable between a first position for receiving a tree and a second position for securing the tree in driven engagement with at least one of the blades on the endless track while permitting the tree to be axially shifted through the delimbing assembly, and
motor means operatively coupled with the grapple means for movement between the first and second positions.

5. The tree harvester of claim 4 wherein the flights are U-shaped brackets each having a flat portion extending substantially between the two chains, the blades being arranged generally in line with the two chains.

6. The tree harvester of claim 1 further comprising means for adjusting tension in the chains.

7. A tree harvester comprising
a frame,
a shear assembly and a delimbing assembly fixed upon the frame in spaced apart relation,
a drive mechanism supported by the frame in operative alignment between the shear assembly and delimbing assembly, the drive mechanism including
endless track means comprising two chains each trained respectively over a drive sprocket and an idler roller with a number of flights interconnected between the chains in spaced apart relation, a plurality of rollers being rotatably mounted on the frame to support a portion of the track means in alignment with the delimbing assembly, the drive sprocket engaging with the track means in generally offset relation to the supported track means portion, the flights having sharpened edges for engagement with the tree and further comprising means for adjusting tension in the chains, the tensioning means comprising an indexing member for rotatably supporting each idler roller, the indexing members being adjustably secured to the frame, grapple means extending outwardly from the frame adjacent the supported portion of the track means and being movable between a first position for receiving a tree and a second position for securing the tree in driven engagement with the projections on a portion of the track means supported by the plurality of rollers while permitting the tree to be axially shifted through the delimbing assembly, and motor means operatively coupled with the grapple means for movement between the first and second position.

8. The tree harvester of claim 7 wherein the indexing members may be rotated on the frame for adjustment, the idler rollers being secured to a common shaft, the ends of the shaft being rotatably supported in bores formed in the indexing members in offset relation to their axes of rotation of the frame.

9. The invention of claim 8 wherein the plurality of rollers includes parallel series of the rollers supported by a bracket mounted on the frame, the rollers further being arranged to maintain a curved path for the flights along the supported portion of the track means so that forces of engagement between the tree and the flights are received substantially on the plurality of rollers.

10. A tree harvester comprising
a frame,
a shear assembly and a delimbing assembly fixed upon the frame in spaced apart relation,
a drive mechanism supported by the frame in operative alignment between the shear assembly and delimbing assembly, the drive mechanism including
endless track means arranged for rotation upon a drive sprocket and rollers mounted on the frame, a plurality of the rollers being located to support a portion of the track means in alignment with the delimbing assembly, the drive sprocket engaging with the track means in generally offset relation to the supported track portion, the track means being provided with projections along its outer surface, the track means comprising two chains each trained respectively over a drive sprocket and an idler roller with a number of flights interconnected between the chains in spaced apart relation, the plurality of rollers including generally parallel series of the rollers supported by a bracket mounted on the frame, the rollers further being arranged to support the flights and substantially receive engagement force of the tree along the supported track portion,
grapple means extending outwardly from the frame adjacent the supported portion of the track means and being movable between a first position for receiving a tree and a second position for securing the tree in driven engagement with the projections on a portion of the track means supported by the plurality of rollers while permitting the tree to be axially shifted through the delimbing assembly, and motor means operatively coupled with the grapple means for movement between the first and second position.

11. The invention of claim 10 wherein the plurality of rollers is arranged to form a path of generally constant curvature between the drive sprocket and idler rollers.

12. An assembly adapted for vehicular mounting to process trees and the like, comprising
a frame,
a processing implement secured to the frame and adapted for receiving and processing the trees, and
a mechanism also secured to the frame and including
an endless drive track having projections on its outer surface and arranged for rotation upon a drive sprocket and rollers mounted on the frame, a plurality of the rollers being located to support a portion of the drive track, the drive sprocket engaging with the track in offset relation to the rollers, the endless track means comprising two chains each trained respectively over a drive sprocket and an idler roller, a number of flights being interconnected between the chains in spaced apart relation, each flight having an outwardly extending, sharpened blade for engaging the tree, the flights being offset relative to the chains for contact with the plurality of rollers so that engagement force of the tree along the supported track portion is received substantially by the plurality of rollers, the blades being arranged generally in alignment with the chains to limit cocking of the blades, motor means coupled to the drive sprocket, grapple means extending outwardly from the frame adjacent the supported track portion and being movable between a first position for receiving the tree and a second position for securing the tree in driven engagement with projections on the supported track portion while permitting the tree to be axially shifting relative to the implement by the tack, and motor means for positioning the grapple means.

13. The tree harvester of claim 5 wherein the means arranged to support the flights are rollers rotatably mounted on the frame.

14. An assembly adapted for vehicular mounting to process trees and the like, comprising a frame, a processing implement secured to the frame and adapted for receiving and processing the trees, and a mechanism also secured to the frame and including an endless drive track having projections on its outer surface and arranged for rotation upon a drive sprocket and rollers mounted on the frame, a plurality of the rollers being located to support a portion of the drive track, the drive sprocket engaging with the track in offset relation to the rollers and an idler roller being arranged opposite the rollers from the drive sprocket and means for varying tension on the endless track, the tensioning means comprising an indexing means which rotatably supports each idler roller and is adjustably secured to the frame, motor means coupled to the drive sprocket, grapple means extending outwardly from the frame adjacent the supported track portion and being movable between a first position for receiving the tree and a second position for securing the tree in driven engagement with projections on the supported track portion while permitting the tree to be axially shifted relative to the implement by the track, and motor means for positioning the grapple means.

15. An assembly adapted for vehicular mounting to process trees and the like, comprising a frame, a processing implement secured to the frame and adapted for receiving and processing the trees, and a mechanism also secured to the frame and including an endless drive track having projections on its outer surface and arranged for rotation upon a drive sprocket and rollers mounted on the frame, a plurality of the rollers being located to support a portion of the drive track, the drive sprocket engaging with the track in offset relation to the rollers, the endless track means comprising to chains each trained respectively over a drive sprocket and an idler roller with a number of flights inter-connected between the chains in spaced apart relation, the plurality of rollers including generally parallel series of the rollers supported by a bracket mounted on the frame, the rollers further being arranged to support the flights along a path of generally constant curvature between the drive sprockets and idler rollers, motor means coupled to the drive sprocket, grapple means extending outwardly from the frame adjacent the supported track portion and being movable between a first position for receiving the tree and a second position for securing the tree in driven engagement with projections on the supported track portion while permitting the tree to be axially shifted relative to the implement by the track means, and motor means for positioning the grapple means.

* * * * *